(12) United States Patent
Steininger

(10) Patent No.: US 10,596,921 B2
(45) Date of Patent: Mar. 24, 2020

(54) PROTECTION BOARD MOUNTING BRACKET

(71) Applicant: Richard Steininger, North Jackson, OH (US)

(72) Inventor: Richard Steininger, North Jackson, OH (US)

( * ) Notice: Subject to any disclaimer, the term of this patent is extended or adjusted under 35 U.S.C. 154(b) by 347 days.

(21) Appl. No.: 15/585,774

(22) Filed: May 3, 2017

(65) Prior Publication Data
US 2017/0320404 A1 Nov. 9, 2017

Related U.S. Application Data

(60) Provisional application No. 62/331,749, filed on May 4, 2016.

(51) Int. Cl.
*B60M 1/04* (2006.01)
*B60M 1/30* (2006.01)

(52) U.S. Cl.
CPC ............... *B60M 1/04* (2013.01); *B60M 1/307* (2013.01)

(58) Field of Classification Search
CPC ........................................................ B60M 1/04
USPC .......................................................... 191/30
See application file for complete search history.

(56) References Cited

U.S. PATENT DOCUMENTS

| | | | | |
|---|---|---|---|---|
| 1,532,836 A | * | 4/1925 | Schmid | B60M 1/307 191/30 |
| 1,837,096 A | | 12/1931 | Banks | |
| 2,048,367 A | * | 7/1936 | Banks | B60M 1/307 191/32 |
| 2,502,756 A | * | 4/1950 | Schmid | B60M 1/307 191/32 |
| 3,475,568 A | * | 10/1969 | Dehn | B60M 1/04 191/35 |
| 3,806,672 A | | 4/1974 | Landis | |
| 4,318,462 A | * | 3/1982 | Weinhaus | B60M 1/30 191/30 |
| D352,015 S | * | 11/1994 | Esworthy | D12/51 |
| 5,905,216 A | | 5/1999 | Davis | |
| 6,386,492 B1 | | 5/2002 | Brown et al. | |

(Continued)

FOREIGN PATENT DOCUMENTS

DE 20 2012 101 576 U1 9/2013

OTHER PUBLICATIONS www.conductix.com, "Transit Power Rail for Third Rail and APM Systems", Conductix-Wampfler, 207, 16 pages.
http://www.lbfoster.com, "Transit Products", 2017, 7 pages.

*Primary Examiner* — Jason C Smith
(74) *Attorney, Agent, or Firm* — Fay Sharpe LLP

(57) ABSTRACT

A cover assembly includes a support bracket from which a cover board is selectively suspended. The support bracket is itself mounted to a third rail or contact rail by a clip which cooperates with the bracket. The cover board is held in place on the bracket by an upper flange which has a tapered or V-shaped front wall, as well as a tapered bottom wall. A flag holder, which can be selectively attached to the bracket, includes a first section with an engaging member that cooperates with an engaging member located on the support bracket, a center section including a through bore for holding a flagstaff of a safety flag and a second end section. The second end section is adapted to attach the flag holder to a different type of cover board support bracket.

20 Claims, 12 Drawing Sheets

(56) References Cited

U.S. PATENT DOCUMENTS

| | | | |
|---|---|---|---|
| 7,926,634 B1 * | 4/2011 | Morales | B60M 1/307 |
| | | | 191/29 R |
| D702,596 S * | 4/2014 | Ciloglu | D12/51 |
| D724,490 S * | 3/2015 | Ciloglu | D12/50 |
| 2017/0320404 A1 * | 11/2017 | Steininger | B60M 1/307 |

* cited by examiner

PROTECTION BOARD MOUNTING BRACKET

This application claims the benefit of Provisional Application Ser. No. 62/331,749 which was filed on May 4, 2016. The entire content of that application is incorporated hereinto by reference.

BACKGROUND

The present disclosure pertains to electric railways, typically used for mass transit systems such as subways and assorted light rail systems. More particularly, it pertains to a bracket for holding or supporting a cover structure above the contact rail or third rail in such electrified railway systems.

Both subway and elevated rapid transit systems include a third rail or contact rail which needs to be insulated because it is electrified (normally with DC power). Such third rails are generally supported on insulators relative to the ground and disposed on one side of a railway carriage. Extending laterally from the carriage is a contact element or shoe which serves to engage the third rail. It is very desirable that such third rails be shielded by covers as much as possible in order to prevent accidental contact with the rail by personnel or by foreign objects, while at the same time permitting engagement of the rail by the contact element or shoe associated with the drive motor of the electrified railway carriage. Also, since such covers must extend for many miles, it is desirable that the structures afford the necessary protection while simultaneously being economical.

It is known to provide brackets which are mounted to the third rail, with the brackets in turn holding a cover board or similar guard or shield that retards objects or people from falling onto or contacting the third rail. However, the known systems are in need of improvement. First, it is labor intensive and, hence, expensive to mount the known brackets, and their cover boards to the third rail. Second, the known brackets which support the cover boards are liable to be damaged by the shoe of the railway carriage as the shoe moves up and down between the cover board and the third rail during travel of the railway carriage. Third, the known brackets do not enable a safety flag holder to be readily mounted to or detached from such brackets.

Thus, it would be advantageous to provide a bracket and cover board system which is inexpensive, not prone to be damaged by the shoe of the railway carriage and is adapted to hold a safety flag. It would also be advantageous to provide a flag holder which is adapted to be mounted to both a conventional bracket and the inventive bracket of the present disclosure.

Accordingly, it would be desirable to provide a cover board and bracket construction which can satisfy the above stated needs and provide better and more advantageous results. It would also be desirable to provide a flag holder which is adapted for use both with conventional brackets and with a bracket according to the present disclosure.

BRIEF SUMMARY

According to one embodiment of the present disclosure, a cover assembly adapted to be mounted to an associated electrified rail is disclosed. The bracket includes an upper limb, a lower limb and a connecting section joining the upper limb and the lower limb to each other. The upper limb and lower limb extend in a common direction. The lower limb is adapted to be mounted to the associated rail. A protrusion extends from the connecting section in the common direction. The protrusion includes a planar upper surface and a tapered lower surface. A cover member is selectively suspended from the bracket upper limb and is positioned between the protrusion and a lower surface of the bracket upper limb.

In accordance with another embodiment of the present disclosure, there is provided a support bracket that is adapted to be mounted to an associated electrified rail and is adapted to support an associated protective cover. A body member of the support bracket includes an upper limb, a lower limb and a connecting section joining the upper and lower limbs to each other. The upper and lower limbs extend in a common direction. The lower limb is adapted to be mounted to the associated rail. The associated protective cover is adapted to be suspended from the upper limb. A first protrusion extends from the connecting section in the common direction. The protrusion is spaced from the upper and lower limbs and is located adjacent the upper limb. The protrusion includes a planar upper surface and a tapered lower surface. The upper surface is adapted for supporting the associated protective cover such that the associated protective cover is held between the first protrusion and the upper limb.

According to still another embodiment of the present disclosure, a unitary one-piece support bracket which is adapted to be mounted to an associated electrified rail and is adapted to support an associated protective cover comprises an upper limb from which the associated protective cover is adapted to be suspended and a lower limb which is adapted to be mounted to the associated rail. A connecting section joins the upper and lower limbs to each other. A first protrusion extends from the connecting section, wherein the first protrusion is spaced from the upper and lower limbs. A second protrusion extends from the connecting section, wherein the second protrusion is spaced from the upper and lower limbs and also spaced from the first protrusion. The upper limb, lower limb first protrusion and second protrusion are all vertically aligned with each other and extend in a common direction.

BRIEF DESCRIPTION OF THE DRAWINGS

The disclosure may take physical form in certain parts and arrangements of parts, preferred embodiments of which will be described in detail in this specification and illustrated in the accompanying drawings which form a part hereof and wherein.

DETAILED DESCRIPTION

Figure 1:
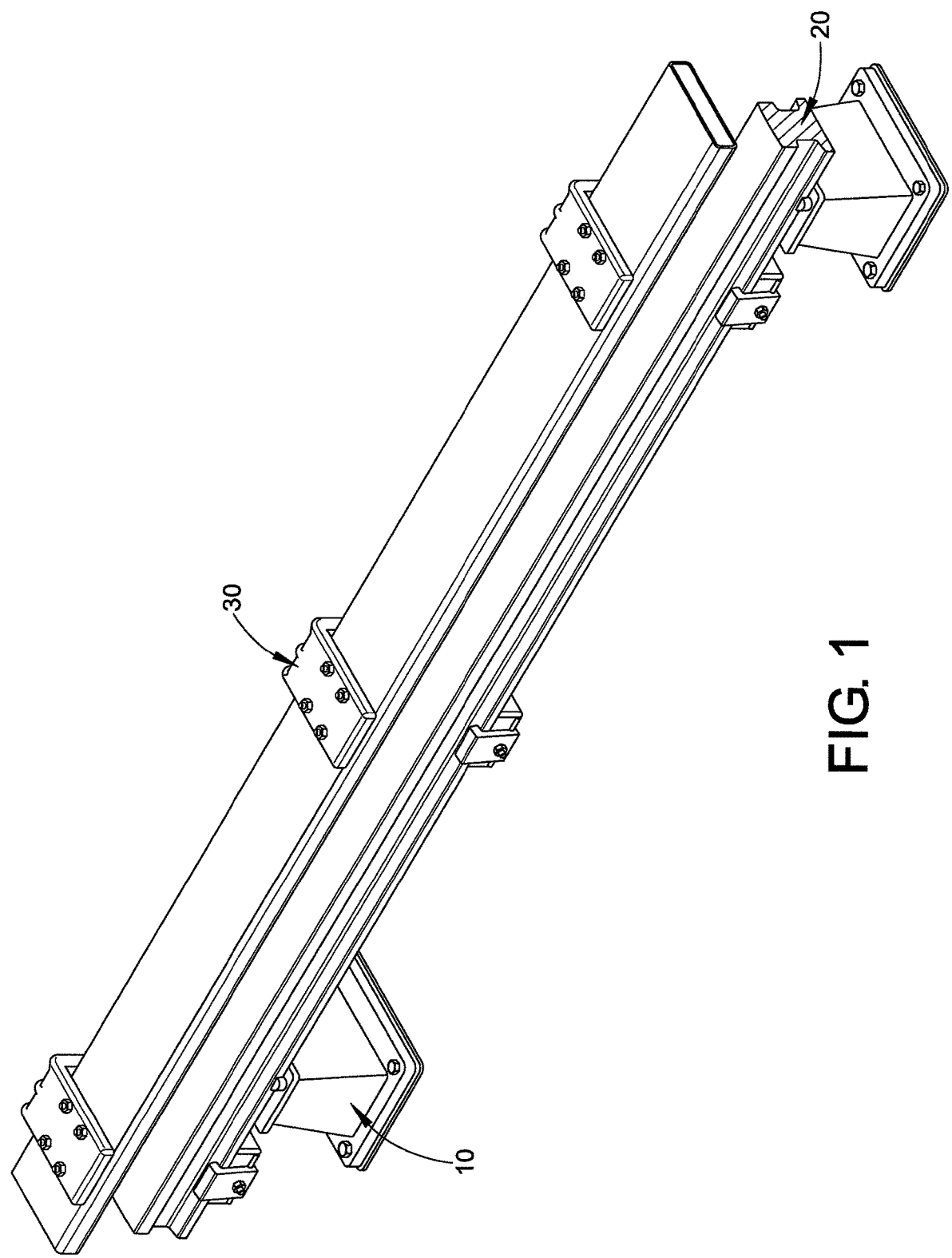
FIG. 1 is a perspective view of a portion of a third rail to which a cover assembly according to the present disclosure is secured, the cover assembly including a protection board or cover board attached to a mounting bracket.

While the instant disclosure is susceptible of embodiment in many different forms, there is shown in the drawings and will herein be described in detail one embodiment of a support bracket, adapted to be mounted to an electrified rail and adapted for supporting a protective cover, according to the instant disclosure. However, it should be understood that the Figures are to be considered only as exemplifying the principles of the instant disclosure and are not intended to limit the disclosure to the embodiment illustrated.

Figure 2:
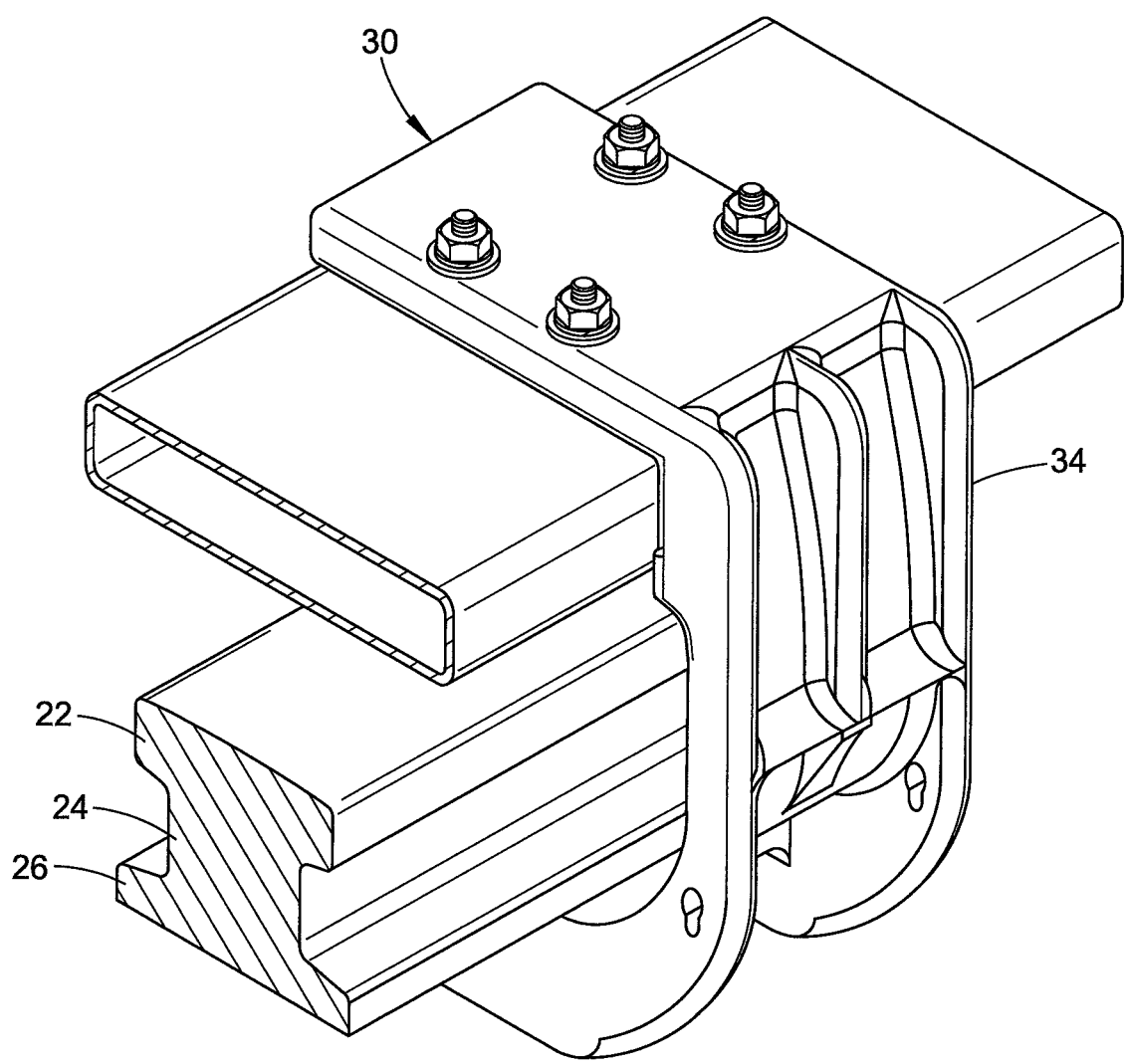
FIG. 2 is an enlarged rear perspective view of a portion of the third rail and cover assembly of FIG. 1, partially in cross-section, illustrating the mounting bracket and the cover board in greater detail.

Referring now to the drawings, FIG. 1 illustrates a third rail system according to the present disclosure. Because the system is electrified, it includes a series of spaced insulators 10. Mounted on the insulators is a contact rail or a third rail 20 which conducts electricity. Conventionally, the third rail can be somewhat I-shaped. With reference to FIG. 2, the third rail can include a head or top section 22, a neck section 24, of a smaller width than the head section, and a base section 26 of a larger width. Mounted to the third rail is a cover assembly 30 comprising a support bracket 34.

Figure 3:
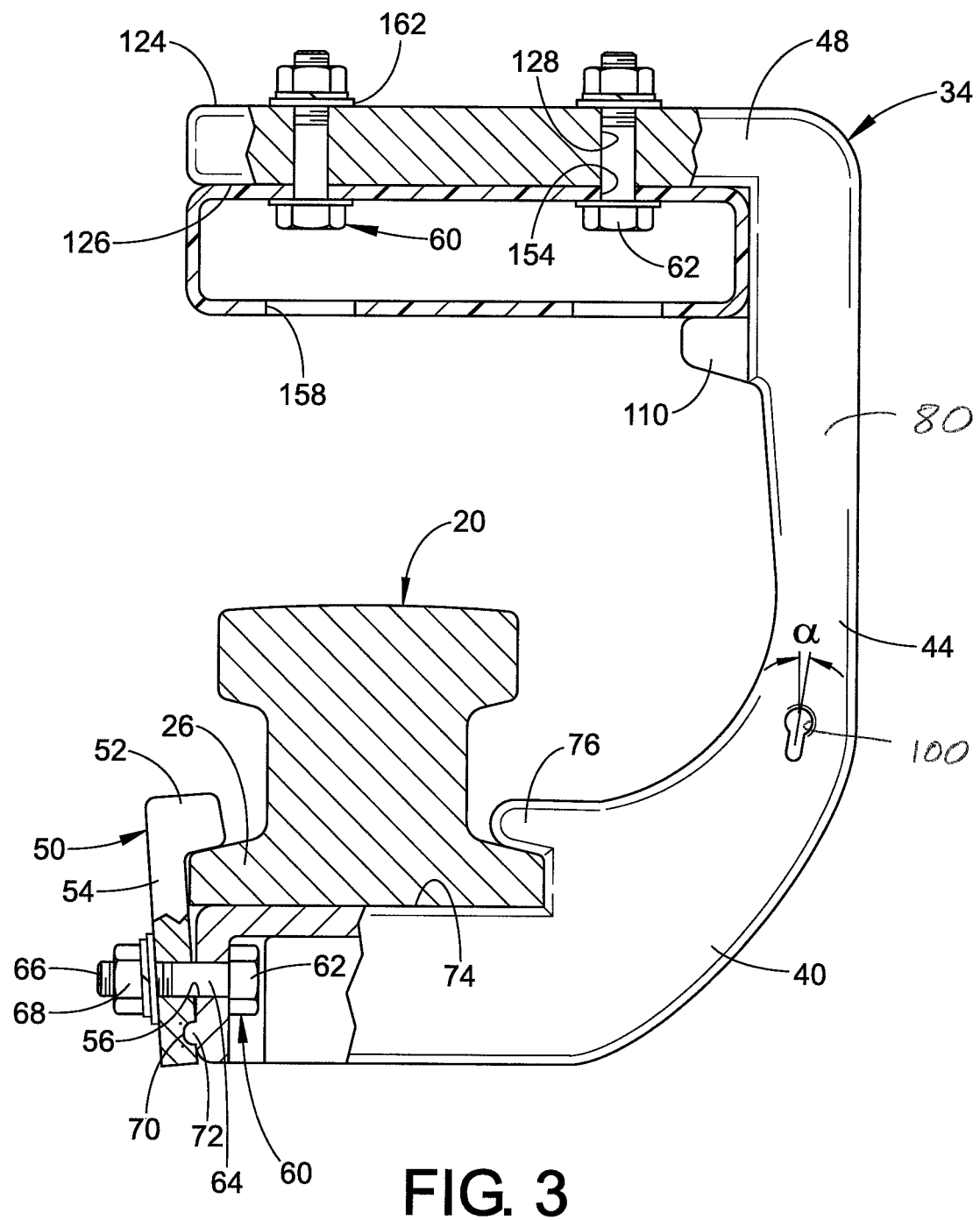
FIG. 3 is an enlarged side elevational view partially in cross section of the cover assembly of FIG. 2.

With reference now also to FIG. 3, the support bracket includes a body member that comprises a base section or lower limb 40 which extends generally horizontally, a connecting section 44 which extends generally vertically, and a top section or upper limb 48 which extends generally horizontally and is aligned with the lower limb so that a vertical plane extends through both the base section 40 and the top section. Thus, the upper and lower limbs 40 and 48 extend in a common direction. Put another way, the bracket in this embodiment is shaped somewhat like a reversed letter "C". Selectively mountable to the bracket 34 is a clip 50. The clip includes a head portion 52 and a stem portion 54. Extending through the stem portion is a bore 56 which accommodates a bolt 60. The bolt includes a head section 62, a shank section 64 which extends through the bore 56 of the clip 50 and an aligned bore in the bracket and a tip portion 66 which is threaded so as to cooperate with a nut 68, such as a lock nut. Thus, the clip 50 is selectively held to the bracket 34 by the bolt 60. The clip 50 can also include a locating groove 70 which cooperates with a protrusion or rib 72 defined on the bracket 34 to correctly position the clip in relation to the bracket.

It should be apparent from FIG. 3 that the clip 50 cooperates with the support bracket 34 in order to hold the bracket on the contact rail 20. Once the bolt 60 tightens the clip 50 to the bracket 34, the bracket is successfully mounted to the rail 20. It should be appreciated that the nut 68 is located on a clamp side of the contact rail, thus allowing for easy visual inspection to determine if the clamp bolt assembly is properly tightened on the rail. By employing a bolt and lock nut assembly to attach the rail clamp to the bracket, the bracket is allowed to be used on elevated structures of electrified railway systems. The bracket base portion 40 includes a rail contact surface 74. Spaced from and located above the rail contact surface 74 and extending from the connecting section 44 is a lower flange 76 which extends in a direction parallel to a plane of the rail contact surface 74. The rail contact surface 74 and lower flange 76 are adapted to accommodate between them the contact rail base section 26.

Figure 4:
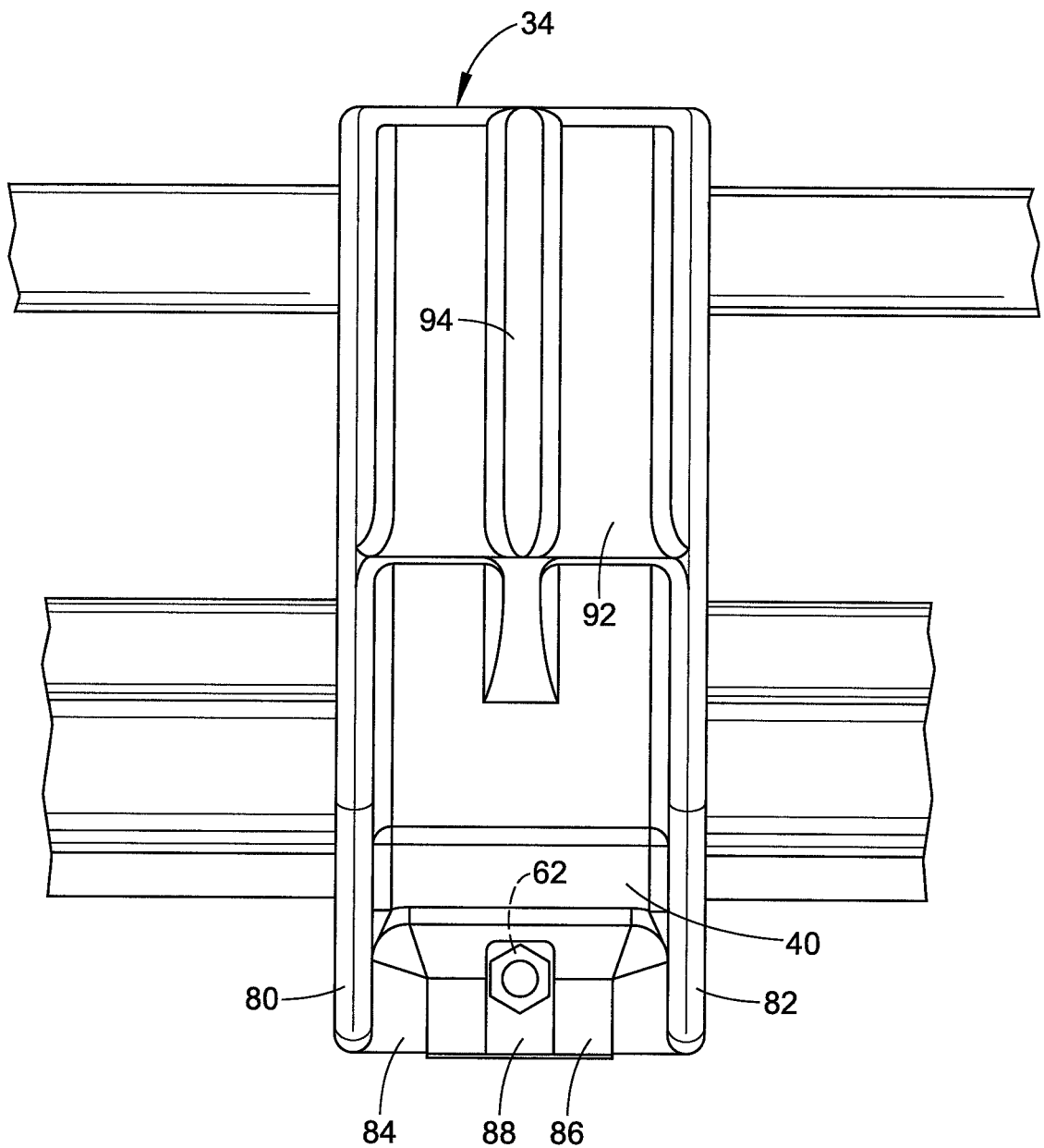
FIG. 4 is a rear elevational view of the cover assembly of FIG. 2.

With reference now also to FIG. 4, the bracket 34 includes a first side wall 80 and, spaced therefrom, a second side wall 82. Extending between them and connecting them is a web 84. Defined in a bottom section of the web, at the base 40 of the bracket 34, is a first indented section 86 and a second indented section 88. The second indented section 88 accommodates the head 62 of the bolt 60. In one embodiment, the second indented section 88 is only so wide as to accommodate the width of the bolt head which, in this embodiment, is hexagonal. Thus, the indented section 88 prevents the bolt head 62 from rotating, as the nut 68 is threaded onto the bolt 60 as shown in FIG. 3.

Extending or protruding from the web 84 is a cross brace 92 which connects the first and second bracket side walls 80 and 82. Extending along a vertical axis of the bracket 34 is a vertical brace 94. The braces 92 and 94 serve to stiffen the web 84 of the bracket 34 and thus strengthen same. The bracket may have a somewhat H-shaped cross section with thickened opposite side walls. There can also be provided a thickened brace section to stiffen the bracket. This bracket design helps reduce its weight and manufacturing time and cost while still allowing for adequate stiffness, and thereby provides an economical support bracket structure.

In one embodiment, and with reference again to FIG. 3, disposed in the first and second side walls 80 and 82 can be respective sockets 100. If desired, these sockets can be canted backwardly away from a vertical axis of the bracket itself by a desired angle α. In one embodiment, the angle may be on the order of 5°.

Figure 5:
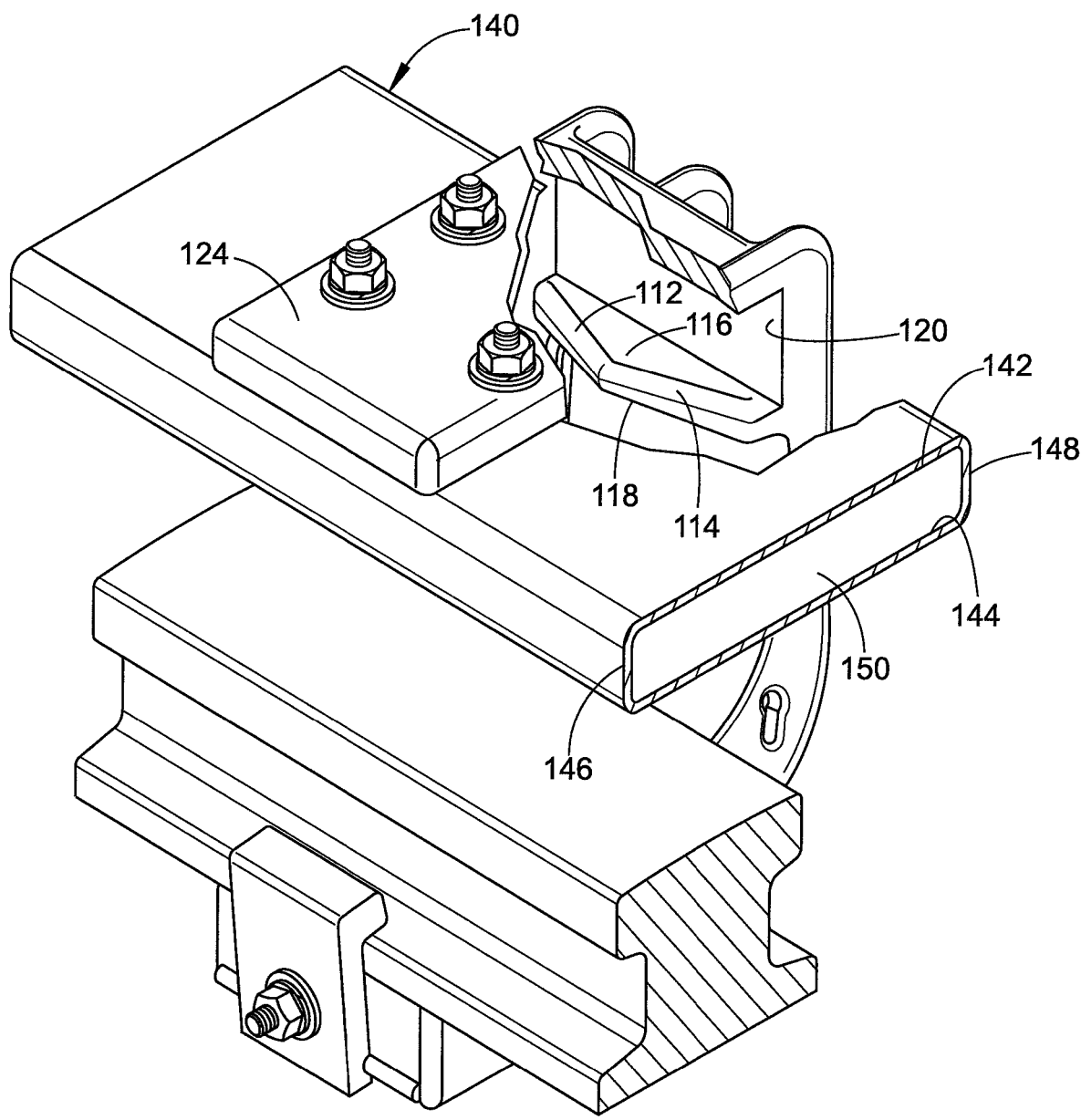
FIG. 5 is a front perspective view, partially in cross section and partially broken away, of the cover assembly of FIG. 2.

With continued reference to FIG. 3, spaced from the lower flange 76 is an upper flange or protrusion 110 that also extends from the connecting section 44. The upper and lower flanges extend in the same direction, i.e., towards the contact rail or third rail 20. With reference now also to FIG. 5, the upper flange or protrusion 110 includes a front wall including a first tapered section 112 and a second tapered section 114. These two sections define a somewhat V-shaped front wall (as seen from above) of the upper flange. The upper flange 110 also includes a flat top wall 116 and a tapered bottom wall 118, as is evident from FIG. 3. The bottom wall 118 tapers upwardly away from its root at the connecting section 44 and towards its free end. Defined between the upper flange 110 and the top section 48 of the bracket 34 is a slot 120.

The bracket top section or upper limb 48 includes an upper surface 124, a lower surface 126 and several spaced bores 128 which extend generally vertically from the upper surface to the lower surface thereof. As is evident from FIG. 1, in one embodiment four such bores, spaced from each other, are defined in the bracket top section. These bores can each accommodate a respective bolt 60. The bracket 34 can be molded from a suitable thermoplastic material so that the bores are defined in the bracket as manufactured.

The bracket 34 can be made of one piece such as by molding. It should be appreciated that the upper flange or protrusion 110 is of one piece with the bracket body member. Thus, the bracket and the protrusion are unitary and of one piece. The lower flange or protrusion 76 is similarly of one piece with the bracket body member.

FIG. 5 also illustrates a cover board or protection board 140. In one embodiment, the cover board can be formed as an elongated hollow structure, such that it comprises an upper wall 142, a lower wall 144, a first or inner side wall 146 and a second or outer side wall 148 which serve to define a hollow interior 150. The cover board may be hollow in order to reduce its weight and cost and also to facilitate its manufacture, such as by extrusion.

However, the cover board 140, even in its hollow form, can be strong enough to support the weight of a normal person, for example, a person weighing 200 pounds. Once a length of cover board is mounted on one or more brackets by being temporarily held between the protrusion 110 and the upper limb 48, holes can be drilled in the cover board in the locations of the several bores 128 defined in each bracket top section 48. In this way, the holes in the cover board are sure to be correctly aligned in relation to the bracket holes. The holes which are drilled in the cover board can have the same diameter as the diameters of the bores 128 extending through the bracket top section 48. Thus, a set of first bores 154 in the cover board have the same diameter as the bores 128. During the time of drilling the first bores 154 in the cover board, as mentioned, the cover board can be temporarily held in place on the mounting bracket between the upper surface or top wall 116 of the upper flange 110 and a lower surface of the top section 48 and perhaps manually.

After the first bores 154 have been drilled in the cover board, it can be removed from the bracket and turned upside down so that a second bore 158, of a larger diameter, can be drilled in the lower wall 144 of the cover board. The second bores 158 are larger in diameter than the first bores 154 so as to accommodate the heads 62 of the respective bolts 60. In this way, the metallic bolts are spaced away from the third rail 20 by being sunk into the cover board 140, as illustrated in FIG. 3. Such a construction lessens the possibility that the bolts could conduct electricity if the shoe of the railway carriage were to contact the underside of the cover board 140. It is noted that the cover board 140 is suspended from the bracket top section or upper limb 48, being held in place by the bolts 60 and nuts 68.

In one embodiment, the cover board and the bracket are both made of a suitable thermoplastic material which does not conduct electricity so as to retard any current flow from the third rail 20 via either the bracket 34 or the cover board 140. For example, the bracket and the cover board or protection board can be made of a nonconductive material, such as fiberglass. Similarly, the clip 50 can be made from a non-conductive electrically insulative or isolating material.

Both the bracket and the cover board can be made to have a desired flexural strength and tensile strength, as well as a compressive strength. Also, the bracket and cover board need to withstand significant static and impact loads. The strength of the disclosed bracket can potentially exceed the strength of known brackets by up to 50%. In one embodiment, the cover board is capable of holding up to 600 pounds with a deflection or movement of the cover board of no more than 3/10 of an inch. It is conceivable that the cover board is strong enough to hold up to 1000 pounds or more if some person or object falls onto the cover board, thereby keeping that person or object away from the electrified rail. Moreover, both the bracket and the cover board can be flame resistant and can be manufactured from a material which is capable of resisting environmental degradation from heat, cold, wind, sand and the like.

In one embodiment, a common bolt 60 can be used both to mount the clip 50 to the bracket 34 and to mount the cover board 140 to the bracket. To this end, the indented sections 86 and 88 in the bracket base 40 prove particularly advantageous. Thus, in the embodiment illustrated, a single type and length of bolt 60 and nut 68 can be used for both purposes and there is no need to stock different sizes and lengths of bolts in order to fasten the bracket in place on the rail 20 and to fasten the cover board to the bracket 34.

Further, as shown in FIG. 3, a lock washer 162 can be employed between the nut and the bracket outer wall when fastening the cover board to the bracket top section 48. A similar lock washer can be employed between the nut 68 and the clip 50 when securing the clip to the bracket lower section 40.

As mentioned, the front wall of the upper protrusion or second engagement flange 110 is tapered. The second engagement flange supports the protection cover board from the bottom and is located above the vehicle shoe as the railway car travels in use. The second engagement flange is tapered away from its center and also tapered upwardly away from its root. Such tapering of the protrusion or second flange 110 is advantageous because this shape of the flange serves to deflect the vehicle shoe if the flange happens to be struck by the shoe during operation of the electrically powered railway carriage. With such a tapered design, the upper protrusion or flange is less likely to be sheared off by the vehicle shoe. At the same time, the upper flange 110 helps to support the cover board both initially, when holes are drilled through the cover board via the apertures or bores 128 which are pre-defined in the bracket top section 48, and subsequently when the cover board is suspended from the bracket via the bolts 60.

Figure 6:
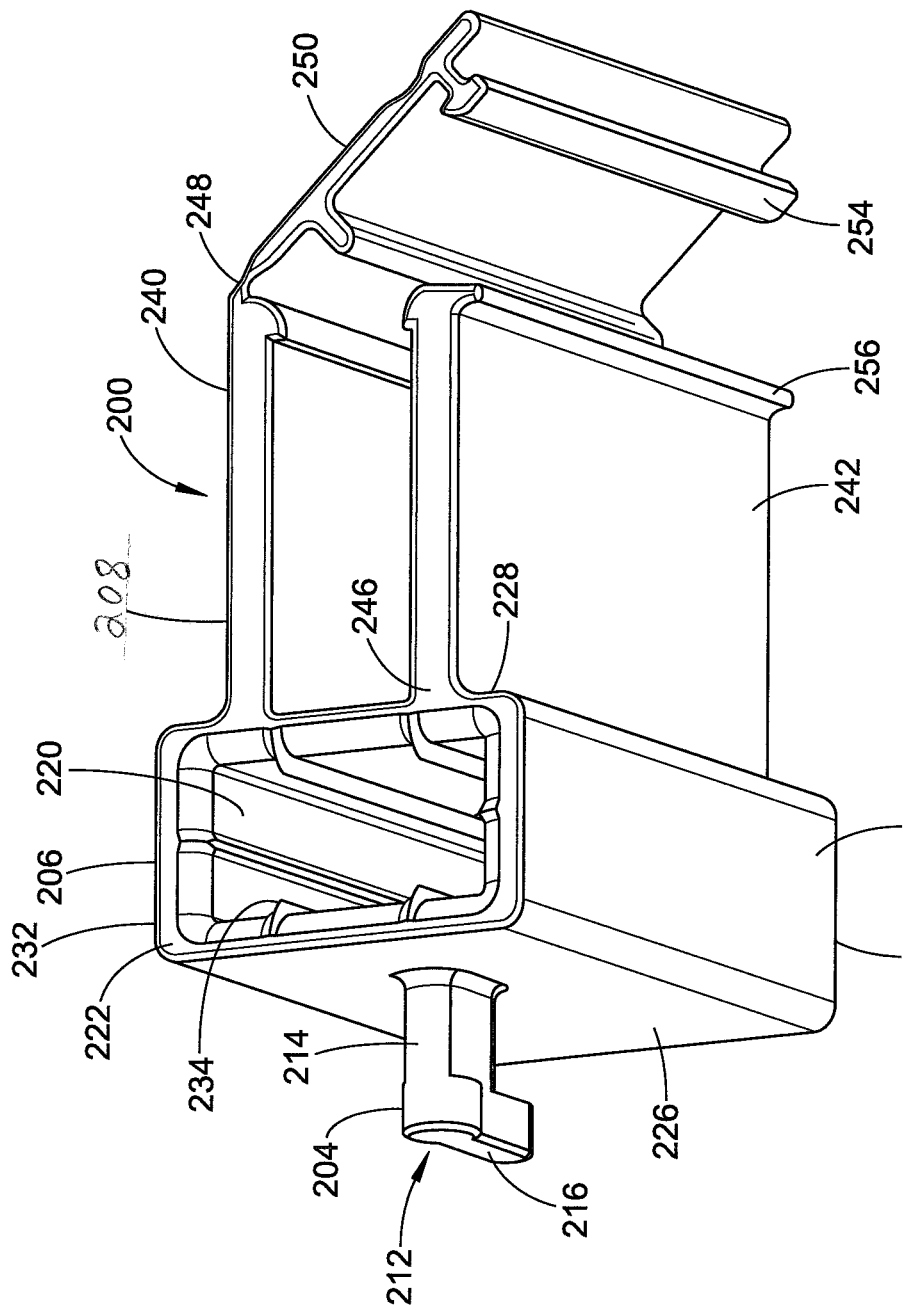
FIG. 6 is an enlarged perspective view of a flag holder according to one embodiment of the present disclosure, the flag holder being selectively connectible to the mounting bracket of FIG. 2.

With reference now to FIG. 6, a flag holder 200 according to one embodiment of the present disclosure can be selectively mounted to the bracket 34. In this embodiment, the flag holder includes a first end section 204, a center section 206 and a second end section 208. Constituting the first end section can be a protrusion 212. In one embodiment, the protrusion can be formed by a stem 214 which can extend generally normal to a wall of the center section 206 and a tooth or similar protrusion 216 which can extend generally normal to the stem 214. It should be apparent that the protrusion 212 is adapted to cooperate with the socket 100 defined in the bracket 34. Thus, the flag holder can be selectively mounted onto the bracket 34 via the socket 100 defined in the bracket.

The flag holder center section 206 includes a bore 220 running from an open upper end 222 to an open lower end 224 of the center section. The bore is defined in the flag holder by a first side wall 226, an opposite second side wall 228 and spaced therefrom opposed first and second end walls 230 and 232. Extending longitudinally along the pair of side walls and perhaps also along the pair of end walls are respective ribs 234. These ribs protrude into the bore 220. The ribs 234 serve to retard any potential wobbling motion by a flag staff or shaft of a flag stick or pole mounted in the flag holder.

Defining the flag holder second end 208 is a holding member that can comprise a first arm 240 and spaced therefrom a second arm 242. Each of these arms includes a proximal end 246 which connects the respective arm to the second side wall 228 of the flag holder center section 206. Connected to a distal end of the first arm 240 via a hinge 248, such as a living hinge, can be a closure or door 250. Defined on an interior surface 252 of the closure or door can be a vertically extending locking element 254 which can be defined in the form of a rib. The rib 254 can cooperate with a suitable protrusion 256 provided on the distal end of the second end wall 242. In this way, the door 250 can be locked in place so as to define a second closed section of the flag holder.

In one embodiment, the flag holder or flag stick holder can be constructed from a non-conductive or electrically insulative or isolating material such as a high strength nylon. The flag holder can be molded or otherwise formed into the desired shape. The flag holder 200 is thus provided on opposite sides of the center section 208 with connection structures which enable the flag holder to be mounted on different styles or types of brackets or cover board holding members.

Figure 7:
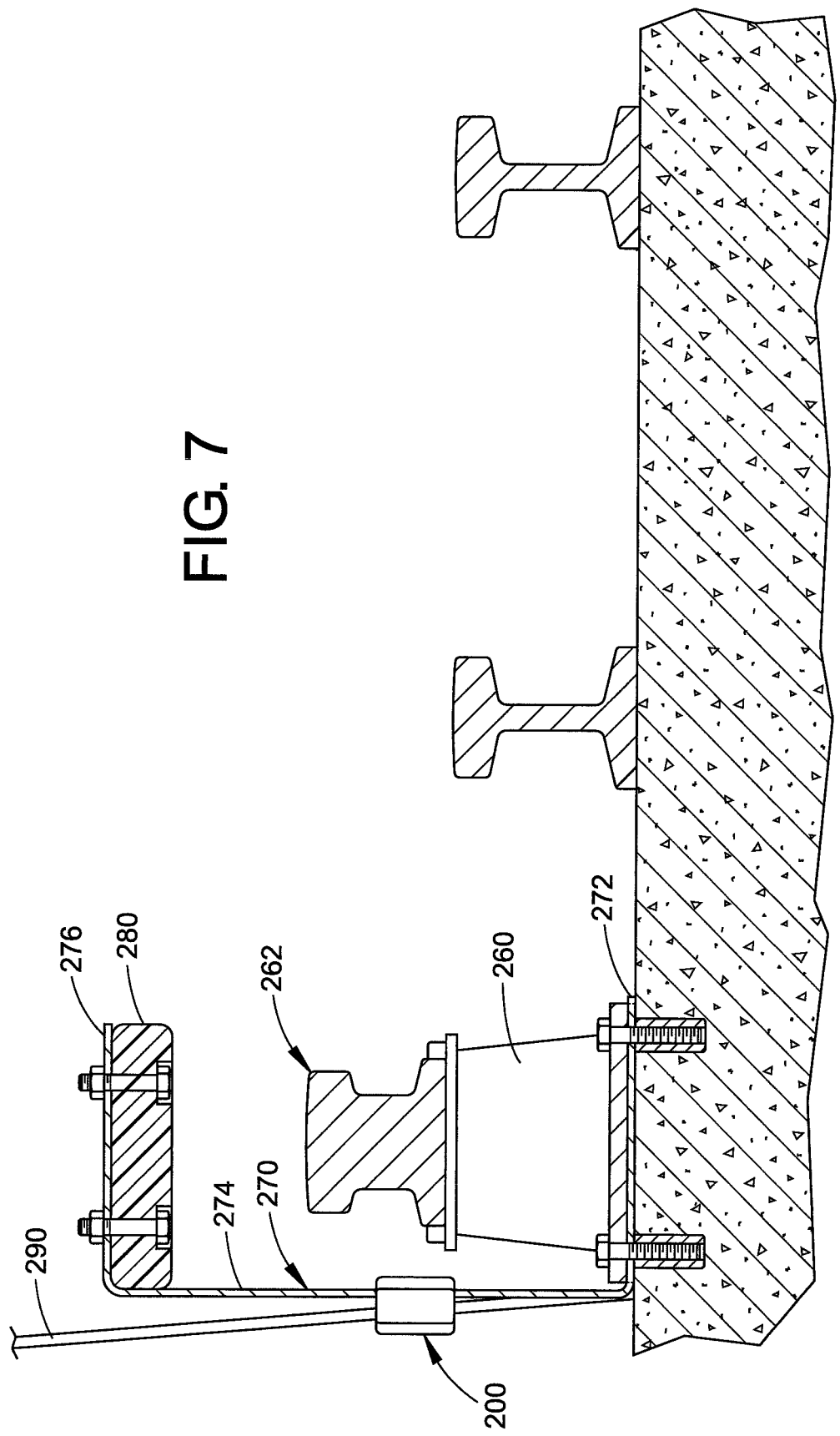
FIG. 7 is a schematic side elevational view partially in cross section of a conventional third rail insulator or cover board assembly including a band-shaped cover board mounting element to which the flag holder of FIG. 6 is mounted, and with a flagstaff of a safety flag held therein.
Figure 8:
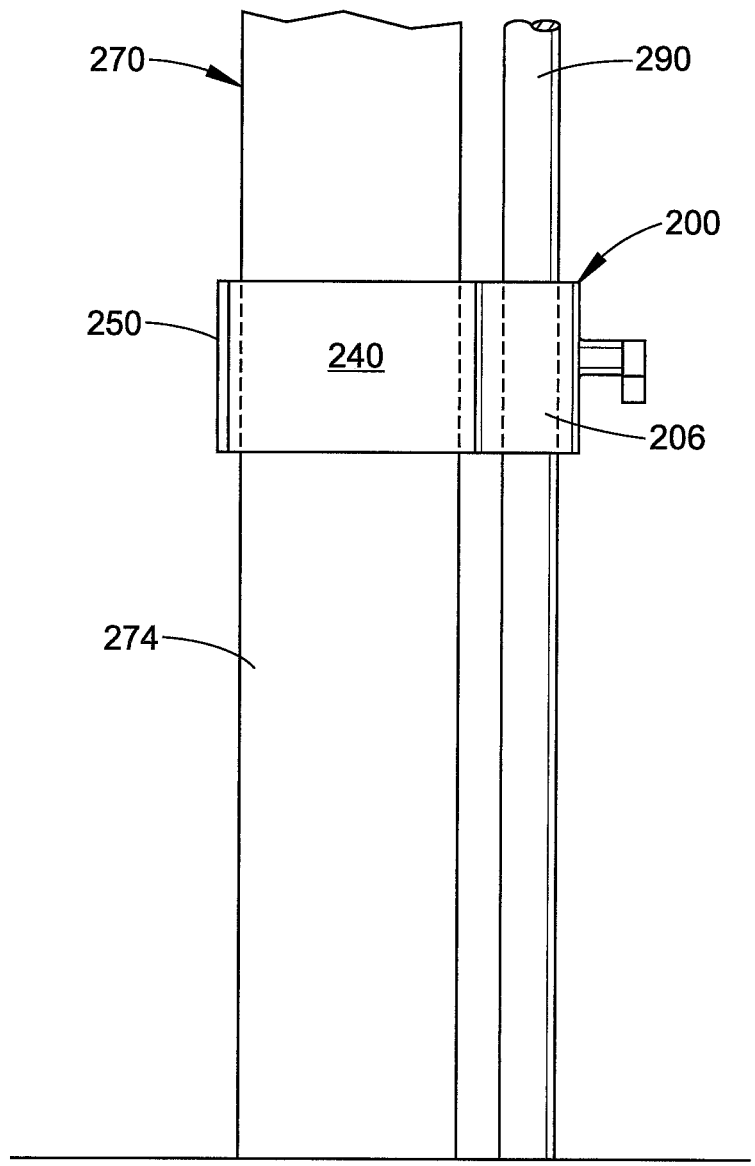
FIG. 8 is an enlarged rear elevational view of a portion of the assembly of FIG. 7.

With reference now also to FIG. 7, a conventional contact rail bracket or holding member construction is there illustrated. This construction cooperates with an insulator 260 on which is mounted a contact rail or electrified third rail 262. The bracket construction can be made of metal and includes a band-shaped bracket 270 having a foot 272 which is trapped beneath the insulator 260 and is secured in place once the insulator is fastened to the ground, an elongated leg 274, as well as a head section 276 to which is mounted a conventional cover board 280, which can be made of wood or plastic. With reference now also to FIG. 8, it can be seen that the two arms of the flag holder are adapted to extend around the bracket construction leg 274 (only arm 240 is visible) and the door 250 is closed in order to mount the flag holder to the band 270. Extending through the bore in the center section 206 of the flag holder 200 is a flagstaff or safety flag stick or pole 290.

As is evident from FIG. 3, the socket 100 can cant backwardly away from a vertical axis extending through the bracket. A reason for canting the socket 100 rearwardly is to lessen the possibility that the flagstaff 290 would be impacted by the shoe of the electrically powered train, thereby breaking the flagstaff and possibly also shearing away the flag holder itself. When the flag holder 200 is mounted on the elongated leg 274 of the band-shaped bracket 270, the arms 240 and 242 are so shaped as to also allow for a rearward canting of the flagstaff 290 at an appropriate offset angle. The safety flag holder quickly and easily attaches a safety flag to the several brackets illustrated herein, thereby positioning the flag at the appropriate offset angle.

Figure 9:
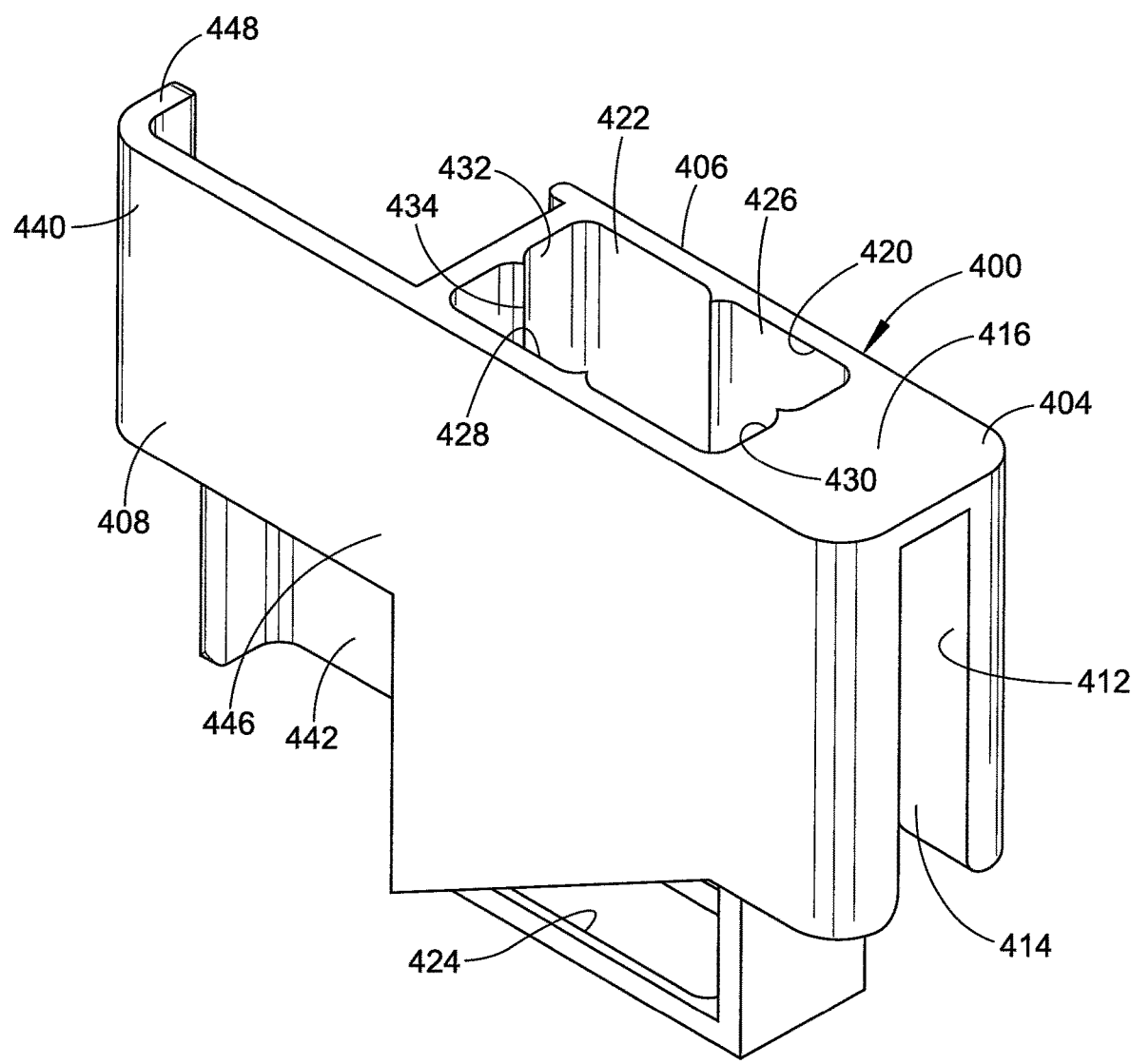
FIG. 9 is a perspective view of a flag holder according to another embodiment of the present disclosure.
Figure 10:
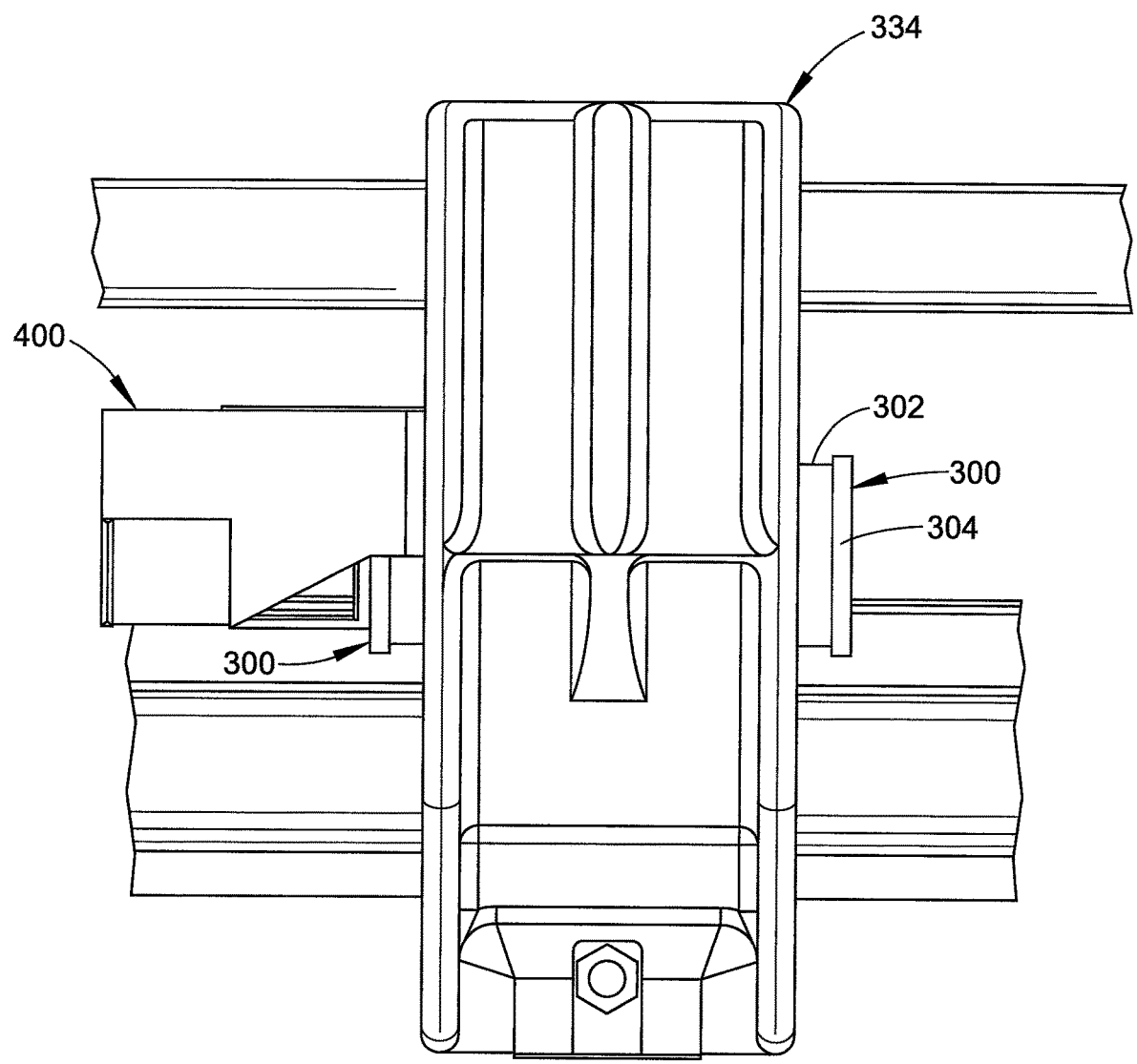
FIG. 10 is a rear elevational view of a bracket according to another embodiment of the present disclosure, which bracket is adapted to cooperate with the flag holder of FIG. 9.

With reference now to the embodiment of FIG. 9, according to another embodiment, a flag holder 400 can be selectively mounted to a bracket 334 (FIG. 10). In this embodiment, the flag holder includes a first end section 404, a center section 406 and a second end section 408. Defined in the first end section 404 is a socket 412. In one embodiment, the socket has an open bottom 414 and a closed top 416. The flag holder socket is adapted to cooperate with an ear 300 (see FIG. 10) extending laterally from a side wall of the bracket 334. As is evident from FIG. 10, the flag holder can be mounted via the socket 412 onto the ear 300. In the embodiment of FIG. 10, extending laterally from the first and second side walls 380 and 382 in a direction away from a web 384 of the bracket are respective ears 300. Each ear includes a base section 302 and an enlarged distal end 304. As in the earlier embodiment of the bracket, the ear 300 can be canted backwardly away from a vertical axis of the bracket by an angle α. That angle may be on the order of 5 degrees, if so desired. In one embodiment, there are two ears 300 extending from the respective side walls 380 and 382 of the bracket 334. Thus, the flag holder 400 can be mounted to either side wall of the bracket.

The flag holder center section 406 includes a bore 420 running from an open top 422 to an open bottom 424. The bore is defined in the flag holder by a first side wall 426, a second side wall 428 spaced therefrom, a first end wall 430 and a second end wall 432. Extending longitudinally along the pair of side walls and pair of end walls are respective ribs or crush beads 434 which protrude into the bore 420. The crush beads 434 serve to securely hold a flagstaff or shaft of the flag stick or pole mounted in the flag holder. In one embodiment, the flagstaff or shaft can be rectangular in cross section. For example, the flagstaff can be made of a wood furring strip.

Located on the flag holder second end 408 are a first arm 440 and, spaced therefrom, a second arm 442. Each of these arms includes a proximal end 446 which connects the respective arm to the second side wall 428 of the flag holder center section 406. Extending at an angle to the proximal end of each arm is a distal end 448. It should be apparent from FIG. 9 that the two distal ends 448 of the two arms angle towards each other. The two arms can extend from opposite side walls of the flag holder center section 406.

Disclosed has been a protection board mounting bracket used for supporting an electrically conductive third rail, that is employed to power electrified vehicles, such as subway trains, light rail systems and the like. The mounting bracket includes a mounting structure allowing the bracket to be mounted to a conductive third rail and to mount a protection board to a top portion of the bracket above the third rail in order to prevent or at least retard persons or objects from contacting the third rail. The protection board is mounted to the underside of the bracket upper end allowing for the underside of the protection board, which is the closest surface to the third rail, to be unobstructed by the upper end of the bracket.

Figure 11:
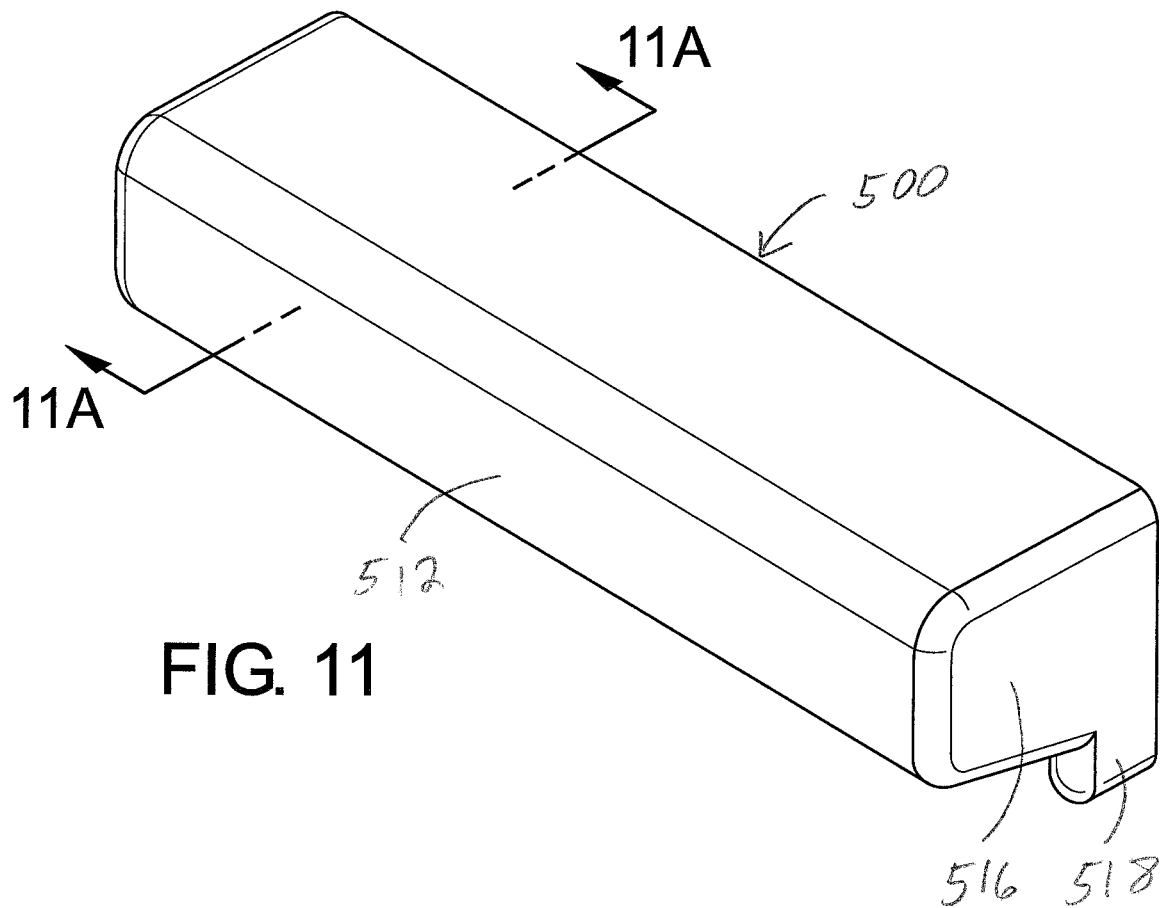
FIG. 11 is a perspective view of a top shim according to one embodiment of the instant disclosure.
Figure 11A:
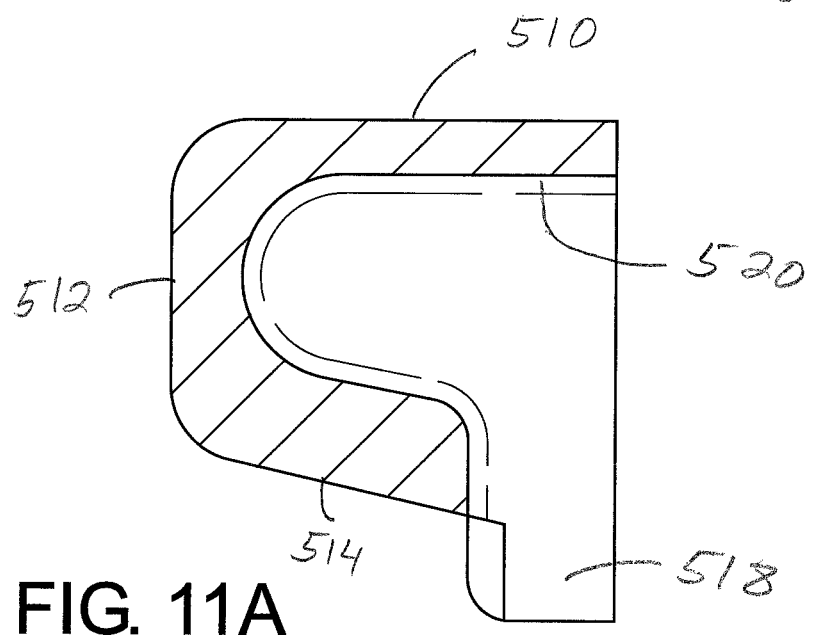
FIG. 11A is a side elevational view in cross section of the top shim of FIG. 11 along lines 11A-11A.
Figure 12:
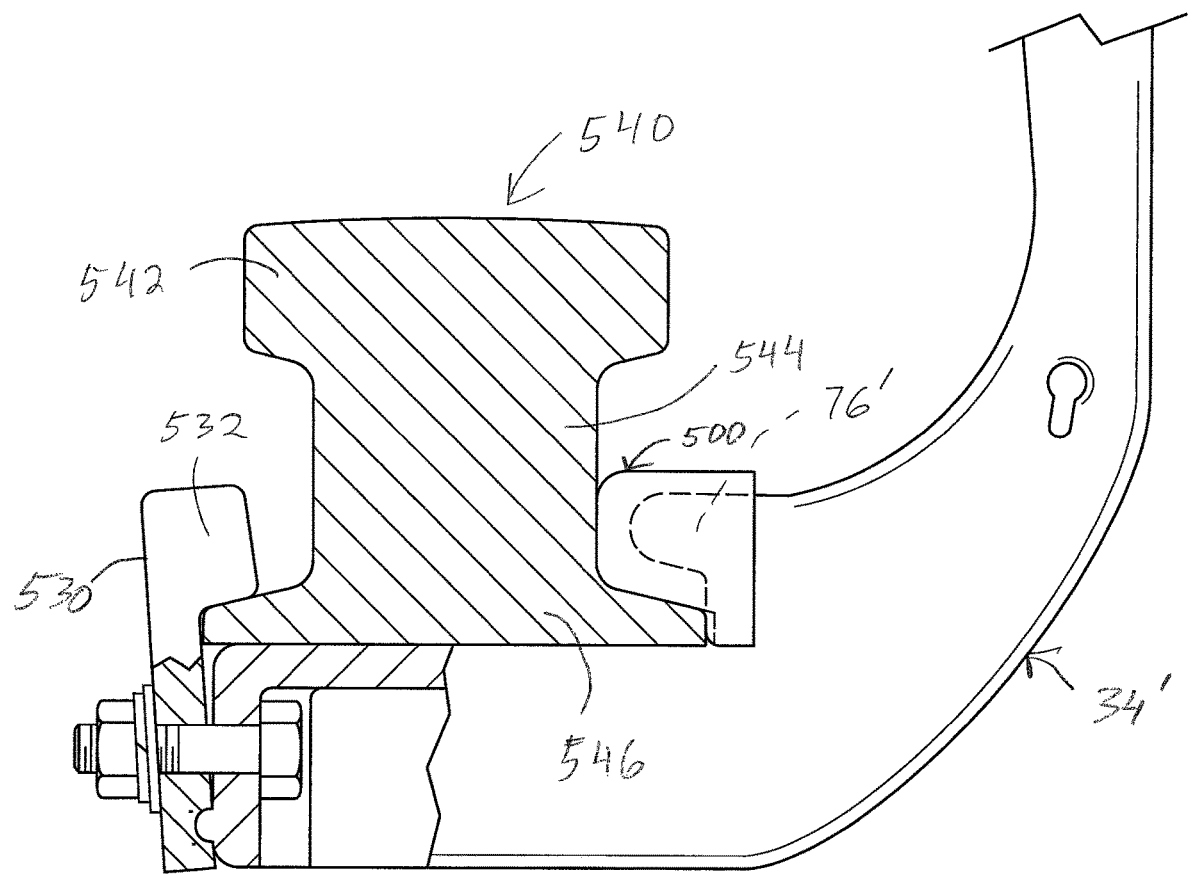
FIG. 12 is a side elevational view partially in cross section of a lower portion of the mounting bracket for holding a second type of electrified rail and employing the cover shim of FIG. 11 for holding the electrified rail between the cover shim and a clip.

With reference now to FIG. 11, if desired, a top shim 500 can also be provided. As is evident from FIG. 12, the top shim can cooperate with a lower flange 76' of a support bracket 34' in order to accommodate a contact rail or a third rail. More particularly, the top shim includes an upper wall 510, a front wall 512, a bottom wall 514, and a pair of opposed end walls 516 (only one of which is visible in FIG. 11). Also, an end flange 518 can be provided on each end of the top shim 500. As is evident from FIG. 11A, the walls of the top shim define a socket 520.

With reference again to FIG. 12, the socket of the top shim accommodates the lower flange 76' of the support bracket 34' so that the top shim can be slipped over the lower flange. Also mounted to the support bracket 34' is a clip 530. This embodiment of the clip includes an enlarged head portion 532. The clip 530 and the top shim 500 cooperate to hold the electrified rail 540 between them. In this embodiment, the electrified rail includes a top section 542, a neck section 544 and a reduced height base section 546. As may be evident from a comparison of the electrified rail embodiment 20 in FIG. 3 and the electrified rail embodiment 540 in FIG. 12, the rail 540 has a base section 546 which is thinner than is the base section of the rail 20 in FIG. 3. Therefore, in order to maintain a desired spacing between the top face of the electrified rail and the bottom face of the cover board, the shim 500 and the clip 530 are employed.

The distance between the top of the electrified rail or third rail and the bottom face of the cover board or protection board can be maintained through the use of the top shim 500 and the clip 530, if needed, irrespective of what type of electrified rail is employed. More particularly, a 3½ inch gap is mandated by many transit systems for the distance between the top of the third rail or electrified rail and the bottom face of the cover board or protection board. Thus, the same contact path is provided for the shoe of the electrified carriage which is powered by the third rail, whether the third rail is of the type illustrated in FIG. 3 or of the type illustrated in FIG. 12. The same height of travel of the shoe of the electrified carriage is allowed by the assembly of the present disclosure, regardless of the type of conductor rail or third rail being employed.

The use of the top shim 500 allows the cover board mounted to the bottom face of the bracket, i.e., suspended from the bracket to be at the same distance from the top of the electrified conductor rail irrespective of what type of conductor rail the bracket is being mounted to.

In addition, the flanges or ears 518 are important in order to prevent the top shim 500 from "walking out" i.e., away from the bracket lower flange 76'. The flanges or ears 518 allow the shim to be properly seated on the bracket.

The brackets of the instant disclosure are meant to be spaced approximately five feet apart. The disclosed brackets can be quickly installed. It is estimated that the installation of the disclosed bracket assembly on a third rail will take about five minutes. This can be compared with the prior art brackets which, if they needed to be drilled into the concrete pad that supports the third rail, would take about one half hour to install.

The bracket can be mounted to an electrified third rail by a nonconductive clamp, via a clamp bolt, a lock washer and a nut. The clamp bolt is retained in a slot in the lower portion of the bracket, thereby retarding or preventing rotation or backing out of the bolt during installation of the clamp. The bracket includes an engagement slot to support a side edge of the protection board. The bracket further includes a first engagement flange or protrusion that engages the electrified rail to help position the bracket on the rail during use. The bracket further includes a second engagement flange or protrusion which supports the protection cover board from the bottom and is located above the vehicle shoe when in use. The second engagement flange is tapered away from its center and also tapered upwardly away from its root to deflect the vehicle shoe if struck by the shoe during use.

A separate safety flag shaft holder can be employed together with the disclosed cover board assembly. The flag holder can engage with the bracket through the use of cooperating elements or members on the bracket and on the flag holder.

The bracket construction disclosed herein, together with the cover board, is advantageous because it directly covers the top of the rail on only one side thereof while leaving the other side open to receive the contact mechanism or shoe of the electrified railway car.

The cover board or protection board when installed via the bracket above the third rail mitigates the potential of an accidental contact of the third rail by objects or people.

A cover board assembly can include in one embodiment a support bracket from which a cover board is selectively suspended via fasteners. The support bracket is itself mounted to a third rail or contact rail by a clip cooperating with the bracket. The cover board is held in place on the bracket by an upper flange which is of one piece with the bracket. The upper flange can have a dually tapered or V-shaped front wall, as well as a tapered bottom wall.

A flag holder which can be selectively attached to different types of brackets includes a first end section comprising an engagement member, a center section including a through bore adapted for holding a flag pole and a second end section which includes a holding member for attaching the flag holder to a known bracket.

Aspects of the disclosure have been described with reference to an embodiment. Obviously, modifications and alterations will occur to others upon a reading and understanding of the preceding detailed description. It is intended that the exemplary embodiment be construed as including all such modifications and alterations insofar as they come within the scope of the appended claims or the equivalents thereof.

What is claimed is:

1. A cover assembly adapted to be mounted to an associated electrified rail, comprising:
    a bracket including an upper limb, a lower limb and a connecting section joining the upper limb and the lower limb to each other, wherein the upper limb and the lower limb extend in a common direction;
    wherein the lower limb is adapted to be mounted to the associated rail;
    a protrusion extending from the connecting section in the common direction, the protrusion including a planar upper surface and a tapered lower surface; and
    a cover member suspended from the bracket upper limb and positioned between the protrusion and the bracket upper limb, the protrusion upper surface being adapted for supporting the cover member such that the cover member is held between the protrusion and the upper limb.

2. The cover assembly of claim 1 wherein the cover member comprises an elongated body which is rectangular in cross-section.

3. The cover assembly of claim 2 wherein the elongated body is hollow.

4. The cover assembly of claim 1 wherein the upper limb and the cover member include aligned apertures each adapted for accommodating a fastener extending therethrough, the fastener aiding in suspending the cover member from the bracket upper limb.

5. The cover assembly of claim 1 wherein the protrusion includes a front wall that tapers to a tip from opposed side walls of the bracket connecting section so that the protrusion is V-shaped in a top view.

6. The cover assembly of claim 1 wherein the protrusion lower surface tapers upwardly from its root towards the protrusion upper surface.

7. The cover assembly of claim 1 further comprising a shim adapted to be mounted to the bracket for accommodating another type of associated electrified rail.

8. The cover assembly of claim 1 further comprising a shim adapted to be mounted to the bracket adjacent the lower limb, the shim adapted to enable the cover assembly to be mounted to a different type of associated electrified rail.

9. The cover assembly of claim 1 further comprising a flag holder which is adapted to be selectively mounted to the bracket.

10. The cover assembly of claim 9 wherein the flag holder comprises a first engaging member which cooperates with a second engaging member defined on the bracket.

11. The cover assembly of claim 1 wherein the bracket and the protrusion are unitary and of one piece.

12. A cover assembly including:

a protective cover located above an associated electrified rail; and a support bracket adapted to be mounted to the associated rail and adapted to support the protective cover, comprising:

a body member including an upper limb, a lower limb and a connecting section joining the upper and lower limbs to each other, wherein the upper and lower limbs extend in a common direction, wherein the lower limb is adapted to be mounted to the associated rail, and a first protrusion extending from the connecting section in the common direction, the first protrusion being spaced from the upper and lower limbs, the first protrusion being located adjacent the upper limb and including a planar upper surface and a tapered lower surface, the upper surface being adapted for supporting the protective cover such that the protective cover is held between the first protrusion and the upper limb.

13. The cover assembly of claim 12 wherein the body member and the first protrusion are unitary and of one piece.

14. The cover assembly of claim 12 wherein the first protrusion includes side walls that taper inwardly from opposed side walls of the connecting section.

15. The cover assembly of claim 12 further comprising a support element adapted to cooperate with an associated flag holder.

16. The cover assembly of claim 15 wherein the support element is defined on a side wall of the connecting section.

17. The cover assembly of claim 16 wherein the support element comprises one of a socket and an ear.

18. The cover assembly of claim 12 further comprising a second protrusion which is spaced from the upper and lower limbs and the first protrusion, the second protrusion extending in the common direction.

19. The cover assembly of claim 18 further comprising a shim which is adapted to cooperate with the second protrusion so as to enable the support member to be mounted to another type of associated electrified rail.

20. A cover assembly comprising:

a cover member suspended above an associated electrified rail; and a unitary, one-piece support bracket adapted to be mounted to the associated electrified rail and adapted to support the cover member, the bracket comprising:

an upper limb from which the cover member is adapted to be suspended;

a lower limb which is adapted to be mounted to the associated rail;

a connecting section joining the upper and lower limbs to each other;

a first protrusion extending from the connecting section, wherein the first protrusion is spaced from the upper and lower limbs;

a second protrusion extending from the connecting section, wherein the second protrusion is spaced from the upper and lower limbs and is also spaced the first protrusion;

wherein the upper limb, lower limb, first protrusion and second protrusion are all vertically aligned with each other and extend in a common direction; and, wherein an upper surface of the first protrusion is adapted for supporting the cover member such that the cover member is held between the first protrusion and the upper limb.

* * * * *